United States Patent [19]

Schnell

[11] Patent Number: 4,747,767

[45] Date of Patent: May 31, 1988

[54] APPARATUS FOR CUTTING COMESTIBLE SUBSTANCES IN DISCRETE METERED PORTIONS

[75] Inventor: Karl Schnell, Winterbach, Fed. Rep. of Germany

[73] Assignee: Karl Schnell Maschinenfabrik, Winterbach, Fed. Rep. of Germany

[21] Appl. No.: 944,666

[22] Filed: Dec. 19, 1986

[30] Foreign Application Priority Data

Dec. 21, 1985 [DE] Fed. Rep. of Germany ....... 3545673

[51] Int. Cl.[4] ................................................ A23P 1/12

[52] U.S. Cl. .................................... 425/311; 264/142; 426/516; 426/518

[58] Field of Search ............... 426/310, 311, 308, 313, 426/312, 317, 289, DIG. 230; 83/580, 604, 627; 264/142; 425/231, 518, 516

[56] References Cited

U.S. PATENT DOCUMENTS

| | | | |
|---|---|---|---|
| 2,090,095 | 8/1937 | Bainbridge | 425/311 |
| 3,019,746 | 2/1962 | Cunningham et al. | 425/311 |
| 3,782,876 | 1/1974 | Groff | 425/311 |
| 4,392,801 | 7/1983 | Meyer | 425/296 |

FOREIGN PATENT DOCUMENTS

| | | | |
|---|---|---|---|
| 538189 | 10/1931 | Fed. Rep. of Germany | 425/317 |
| 712402 | 7/1954 | United Kingdom | 425/311 |

*Primary Examiner*—Jay H. Woo

*Assistant Examiner*—C. Scott Bushey

*Attorney, Agent, or Firm*—Toren, McGeady & Associates

[57] ABSTRACT

An apportioning apparatus, particularly for dispensing discrete metered quantities of comestible material, such as sausage meat, wherein a cutter is first moved parallel to a surface surrounding a nozzle outlet from which the comestible material is dispensed and wherein after cleanly cutting through the dispensed material emerging from the nozzle outlet, the cutter is advanced in a direction away from the nozzle outlet surface in order to effect a clean cutting process with the cutter then being returned to its initial position to commence a further cutting operation. The cutter is mounted to be driven and guided by an articulation mechanism which includes a power cylinder device and metering gear pumps operate to dispense the comestible material through one or a plurality of outlet nozzles at which the material is cut.

17 Claims, 3 Drawing Sheets

APPARATUS FOR CUTTING COMESTIBLE SUBSTANCES IN DISCRETE METERED PORTIONS

FIELD OF THE INVENTION

The invention is generally directed to an apportioning machine with a charging or feeding pump and at least one outlet nozzle operatively connected therewith. Such apportioning machines are predominantly used in the foodstuff industry. A particular field of application is the meat processing industry, in which the meats and in some instances also bones and the like are processed by means of suitable comminution machines or devices into an apportionable mass. When the mass exits from the outlet nozzle without a sausage skin or casing, it must be sufficiently rigid so that it does not fall apart under its own weight. A string or strand from the mass is thus formed, which can be subdivided or cut into individual portions by means of this type of apportioning machine. A very specialized use for the machine is, for instance, the production of so-called "Cevapcici".

OBJECT OF THE INVENTION

It is the primary object of the invention to provide an apportioning machine of the above kind which is capable of subdividing or cutting the string exiting from the nozzle mouth into pieces or portions of predetermined length without causing appreciable deformation of the ends thereof.

It is also an object of the invention to provide such a machine which operates continuously, is of sturdy, simple and inexpensive design and readily serviced.

SUMMARY OF THE INVENTION

The above objects are obtained by an apportioning machine with a filling or charging pump and at least one outlet nozzle operatively connected therewith which, in accordance with the invention, has a movable cutter or knife which can be advanced and retracted adjacent the mouth or orifice of the nozzle.

By arranging a particularly sharp, blade-like cutter in the region of the nozzle outlet which is rapidly advanced as soon as the mass has exited to a sufficient extent beyond the nozzle outlet and which is equally rapidly retracted, the string of mass is subdivided into the desired, individual portions or pieces. In doing so, the cutter can move directly alongside the nozzle outlet, in order to obtain a particularly clean surface of the cut and without changing or deforming the cross section of the string.

As a rule, portions of equal length are desired. This applies particularly to industrial production. For this reason, it is advantageous if the cutter is movable, for example, slidable, of predetermined, preferably adjustable, time intervals.

Pursuant to the invention, it is proposed that the cutter in its advanced position can be lifted off the nozzle outlet or mouth and can be moved back toward the nozzle mouth prior to the start of the cutting movement. By lifting the cutter, which, during the cutting, moves along the nozzle orifice, at the end of the cutting procedure, it-is rendered feasible to process a continuously exiting strand of mass without there being any tendency of deformation of the ends of the portions or pieces which are formed during the cutting. On the other hand, this lifting of the cutter away from the nozzle outlet requires a subsequent timely movement back or approach of the cutter towards the nozzle outlet in order to be able, during the next working stroke, to slide directly along the latter during the next working stroke. The lifting of the cutter off the nozzle outlet may, at the same time, also impart an impulse to the severed portion in the conveyance direction.

It is particularly advantageous if the cutter is pivotably mounted at a displacement link so as to be able to pivot about an axis which extends in the longitudinal direction of the cutter and perpendicular to the advancement direction. For this purpose, the cutter is connected with a pivot drive. Due to this pivotable mounting of the cutter, the guide means for the cutter may be stationary relative to the nozzle while, nevertheless, the necessary lifting and advancing motions can be readily obtained.

Pursuant to one embodiment of the invention, the drive for causing the pivoting or swivelling of the cutter provides a working cylinder, particularly a pneumatically operating working cylinder which, at the same time, forms a cutter-displacement drive, and that the working direction of the corresponding working piston extends about parallel to the working direction of the displacement link. In this type of construction, the working piston is coupled with a lug or the like of the cutter or of a cutter carrier, the coupling being effected by means of a rotary joint. The axes of rotation of the rotary joint and of the cutter or the cutter carrier extend parallel to each other. Further, the rotational movement of the cutter and its advance movement need not necessarily occur separately, but rather can at least partially overlap. On the other hand, the displacement movement is permitted to start only at the time when the knife has arrived at the nozzle outlet or at its predetermined displacement plane and, in doing so, has not yet reached the strand.

In a particularly advantageous embodiment of the invention, the lug or the like is extended beyond the rotary joint of the working- or power piston and the extension piece carries an abutment element which is mounted in an oblong or elongated hole of a control member so as to be displaceable and rotatable, the oblong hole extending parallel to the working cylinder and to the longitudinal axis of the displacement link or member. Due to this arrangement and while utilizing the displacement motion of the working piston, a pivoting or swivelling of the knife away from the nozzle outlet is achieved in a simple manner. This occurs particularly advantageously if the pivot axes of the cutter or the cutter carrier and the lug at the power or working cylinder in the initial position of the cutter are located approximately in a common plane which extends perpendicular to the longitudinal axes of the displacement link and the working cylinder; and also, if the control link in the initial position of the cutter has a maximum distance from the end of the oblong hole—which serves as abutment—and if the control link at the end of the cutting motion bears against the abutment. During the cutting procedure, the abutment members then along the oblong hole and—viewed in advancing direction, it arrives at the front or rear end of the oblong hole at a time when the cutting procedure has terminated. Thus, the further advance motion is terminated not only of the abutment element, but also of the working piston and of the cutter.

If the power piston is subsequently moved in the opposite direction, for instance, by pressure reversal or the use of a double-acting power cylinder, this will cause torque at the cutter or the cutter carrier which will lift the cutter off the surface of the nozzle outlet, wherein a small swivelling motion around the swivelling axis of the cutter or its cutter carrier occurs at the displacement link.

In order to enable tolerances as tight as possible for the rotary joints as well as for the sliding guide of the abutment member, it is of particular advantage that the cylinder of the power piston and the control member are swivellable around parallel axes which also extend parallel to the swivelling axis of the cutter and the articulation axis of the lug or the like. The power cylinder and the control link can therefore execute a pendulum motion in this manner around their suspension axes to the extent required.

In accordance with a further aspect of the invention, the cutter is designed as a flat planar strip extending obliquely to the plane of the surface of the nozzle outlet during the cutting operation. In this manner, there is obtained a particularly good cut which minimizes or avoids deformation of the cut material. Additionally, it is possible to simultaneously cut two or more strings extending adjacent each other with this cutter.

The geometric axis of the displacement link is appropriately situated approximately in the plane of the nozzle outlet or outlets. This means that the displacement direction of the displacement link extends parallel to the plane of the nozzle outlet, while the plane of the cutter encloses a preferably acute angle with the plane of the nozzle outlet. This also contributes to a good functional result and enables the continuous outflow of the mass of material to be cut also during the cutting process.

Another embodiment of the invention consists in that an imagined plane extends approximately perpendicularly to the plane of the nozzle outlet through the geometric axes of the displacement link, of the power cylinder and of the control link. In this manner, the cutter can be advanced and retracted on a circular path free of tilting.

In a preferred embodiment of the invention, the plane of the nozzle outlet extends obliquely relative to the longitudinal axis of the nozzle or nozzles. This means that the longitudinal axis of the nozzles is also arranged obliquely to the geometric axes of the displacement link, the power cylinder and the control link. The inclination of the nozzle outlet is selected such that during the cutting process, the plane of the cutter which, as stated, is arranged obliquely to the geometrical axis of the displacement link and stands approximately perpendicular to the geometrical axis of the outlet nozzle. Furthermore, the inclinations are selected such that the cutter moves transversely to the string of the dispensed mass as well as in its conveyance direction when it slides along the inclined nozzle outlet.

Another aspect of the invention is characterized by the location of the nozzle at the outlet of a metering device, in particular, of a gear wheel metering pump which, as is known in the art, may comprise a pair of gear wheels with the mass to be conveyed being located in the gaps of the teeth when the gear wheels rotate. The mass conveyed per unit time can be varied by changing the rpm of the gear pump.

In a particularly preferred embodiment of the invention, several gear wheels are fastened to a common drive shaft of a gear wheel metering pump set consisting of several adjacent gear pumps, wherein the outlet nozzles are arranged adjacently in a row with a single common cutter for all the outlets. The length of this cutter is determined by the number of nozzles and its width, viewed in the cutting direction and is essentially fixed by the diameter of the nozzle outlet. Because of the fact that all powered gear wheels of the juxtaposed metering gear pumps sit on a common drive shaft and, thus, are powered by a common motor, a string or mass of equal diameter is dispensed with equal velocity from each nozzle if all nozzles are of the same dimension. With each cutter stroke, a number of portions corresponding to the number of metering pumps is thus produced.

Between the individual pumps of the gear wheel metering pump set, there are located, particularly in the outlet region, intermediate disc pieces which fix the spacing of the nozzles or the nozzle outlets, and which possibly also seal the pressure sides of the individual metering pumps against each other.

In a further embodiment of the invention, the inlets of the gear wheel metering pumps are connected with each other by a lateral distributor, whose inlet stub or the like is connected with the charging pump in the flow cycle so that the medium can be supplied to all metering pumps by one single charging pump.

In another preferred aspect of the invention, there is provided a conveyance member for the cutoff portions which can be moved beneath the nozzle outlets or past the nozzle outlets. It must be arranged in such a way and be placed in such a manner particularly as far as the level is concerned that, on the one hand, the portions are not deformed when they are deposited thereon and, on the other hand, the exit process of the string of the mass and the cutoff process are not impaired by the conveyance member.

The conveyance member is designed in a particularly advantageous manner as a web particularly from paper which can be reeled off a roll. This paper web together with the portions resting thereon can later on be subdivided into transportable or shippable units. The paper web or the like is furthermore supported on an endless conveyor belt and, in a further embodiment of the invention, the level of the conveyor belt appropriately can be adjusted in order thereby to enable height adaptation to the nozzle outlets. Thus, with an oblique course of the conveyor belt plane with respect to the imaginary plane through the geometrical axes of the sausage-shaped portions, a variation of the length of the portion in a specific magnitude is made possible. A further advantage of the invention results from the cutters being advanceable by means of a preferably adjustable cadencing device, in particular, an electropneumatic one. In commonly used filling machines, such an impulse can be made use of without complications because it is required, for instance, for the twisting off of the sausages or the attachment of a clip. Since apportioning is possible in a preferred manner with the inventive apportioning machine with continuously powered metering pumps, one single impulse is sufficient for the cutting operation and a second impulse for a pause can therefore be eliminated. Naturally, the charging speed of the charging pump must be adapted to the mass of material exiting from the metering pump or pumps. Conventional electronic controls enable it to easily adapt to the different devices and aggregates exactly to each other and to exactly fix the impulse spacing as a function of the quantity conveyed by the metering pumps and the desired portion. In particular, it is possible to preselect a specific weight or a specific quantity conveyed at the charging pump.

If, for instance, fifteen nozzles are used, the size of the portions then corresponds to the adjusted conveyance quantity of the charging pump between two impulses divided by the number of nozzles.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described a preferred embodiment of the invention.

DETAILED DESCRIPTION OF THE PREFERRED EMBODIMENT

Figure 1:
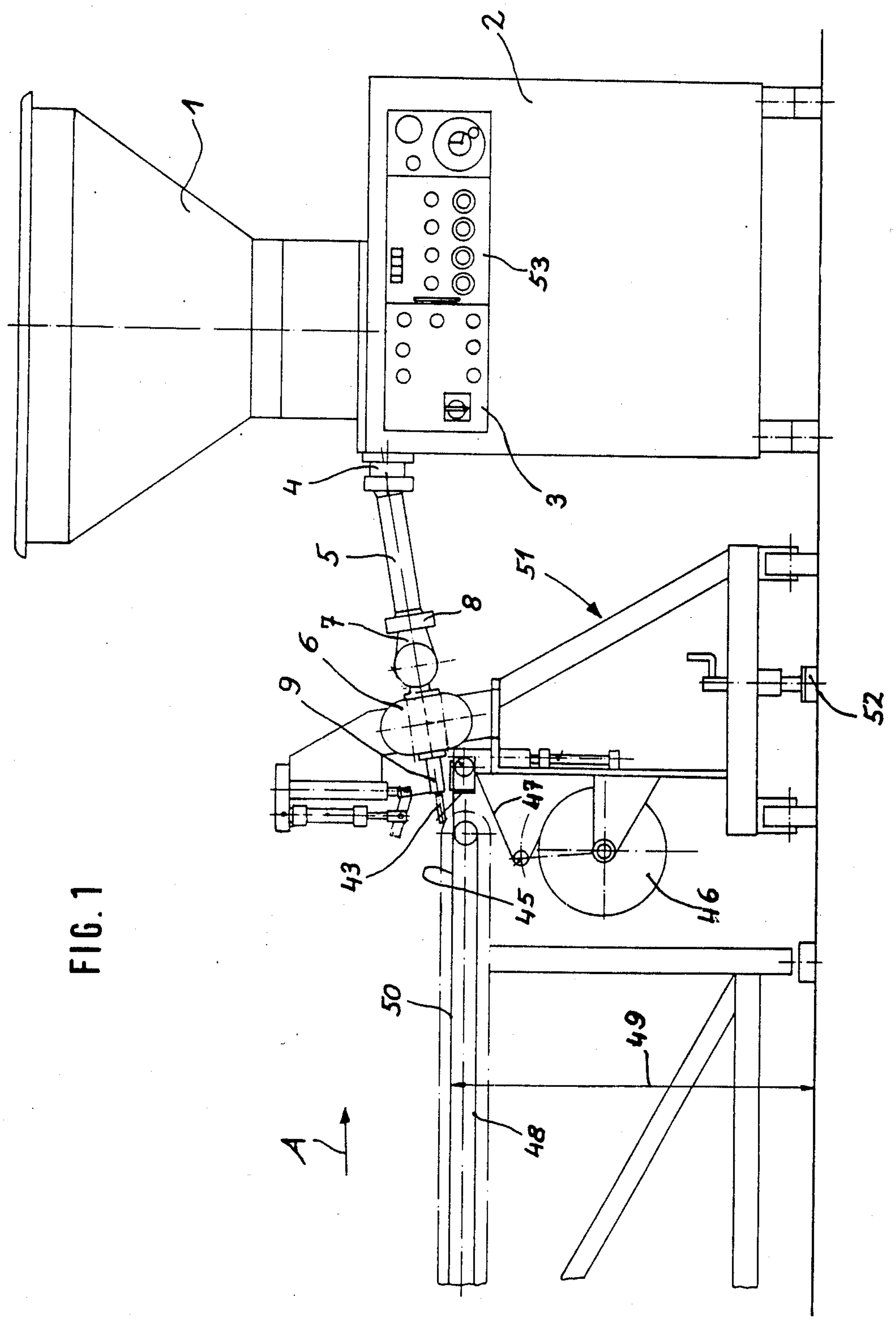
FIG. 1 is a side elevation of a machine in accordance with the invention.
Figure 2:
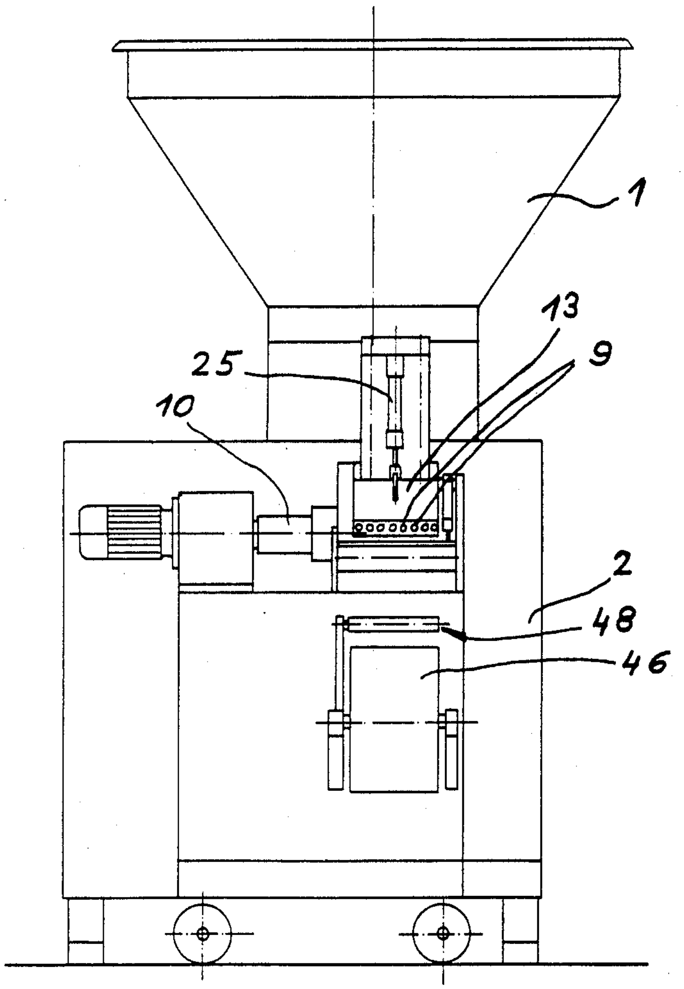
FIG. 2 is a front view of the machine taken in the direction of the arrow A of FIG. 1.

Referring now to the drawings, and particularly to FIG. 1, there is shown apparatus in accordance with the present invention comprising a device 2. Charging material to be dispensed in discrete portions is introduced into a funnel 1 of the device 2. The device 2 contains at least one charging pump 3. Additionally, at least one comminution device can be built into the device 2, which comminutes the commodity or substance introduced into the funnel 1 possibly onto a desired degree of fineness. The commodity conveyed by the charging pump 3 arrives through an outlet 4 and a connecting line 5 at a gear wheel metering pump set 6 consisting of a plurality of gear metering pumps. A lateral distributor 7 is arranged upstream of the metering pump set and a connecting flange 8 is attached to the connecting line 5 in a sealing fashion. Each gear metering pump of the metering pump set 6 comprises an outlet nozzle 9. In FIG. 2, nine such nozzles are shown. According to FIG. 3, the metering pump set 6 consists of fourteen metering pumps 10. It is intended that the quantity of the metering pumps 10 can vary within wide limits. The smallest unit may consist merely of one single metering pump, whose inlet is directly connected to the connecting line 5. Furthermore, as can be discerned from FIG. 3, intermediate discs 11 of differing thickness can be inserted between the individual metering pumps 10. These no only determine the side spacing of the individual outlet nozzles 9, but they can also serve as a portion of the pump housing.

The commodity or substance emitted from each nozzle outlet 12 is cut or sheared at a predetermined time by means of an advanceable and retractable cutter 13. The substance being processed may, for instance, consist of rigid comestible material, such as sausage meat or other meat substance, and it is subdivided into individual discrete portions of specified length. For instance, it can be discerned from FIG. 4 that the cutter thickness is comparatively small and its width is fixed corresponding to the diameter of the nozzle outlet. The length of the cutter orients itself according to the width of the gear wheel metering pumps of the set 6 measured in the direction of the geometrical axis 14 of a drive shaft 15 for all upper gear wheels 16 by way of example. In the last mentioned case, there are included a powered wheel 16 and a driven wheel 17. The functional mode of such gear wheel metering pumps is known and, for this reason, will not be explained in more detail. The comestible substance is conveyed through the tooth gaps 18 or 19 to the outlet nozzle 9. Thus, all the strings of the emitted mass are cut through by one single cutter stroke.

The cutter 13, as already indicated, advances in the direction of the arrow 20 and is retractable in the opposite direction. During the cutting operation, the cutter slides along the nozzle outlet 12, wherein the strings are sheared off at high speed. This will be explained in more detail hereinafter.

The cutter 13 is supported at a displacement link 22 to swivel around an axis 21 extending in its longitudinal direction and perpendicular to the advance direction 20 and it is connected with a swivel drive 23. The embodiment depicted, in addition, provides a cutter carrier 24 at which the cutter is retained so as to be replaceable. Thus, in the embodiment shown, the cutter is supported indirectly through the cutter carrier 24 so as to swivel at the displacement link 22. The swivel drive 23 includes a pneumatic power cylinder 25 which also advantageously operates as a cutter displacement drive. The working directron of the power piston 26 of this power cylinder 25 extends parallel to the working direction of the displacement link or its guidance support 27. The power cylinder 26 is coupled with a lug 29 of the cutter carrier 24 through a rotary joint 28. This lug extends beyond the rotary joint 28, wherein the extension 30 carries, for instance, a bolt-shaped abutment member 31.

The abutment member 31 engages into an oblong hole 32 of a control link 33 and is displaceable therein in the direction of the double arrow 34 and is rotatable around its axis. The oblong hole and in particular also the entire control link 33 extends parallel to the power cylinder 25 or the displacement link 22, meaning that the geometrical axes of these three elements extend parallel and preferably in a common plane perpendicular to a plane extending through the cutter 13 and all the nozzle outlets.

Figures 3, 4, 5, 6, 7:
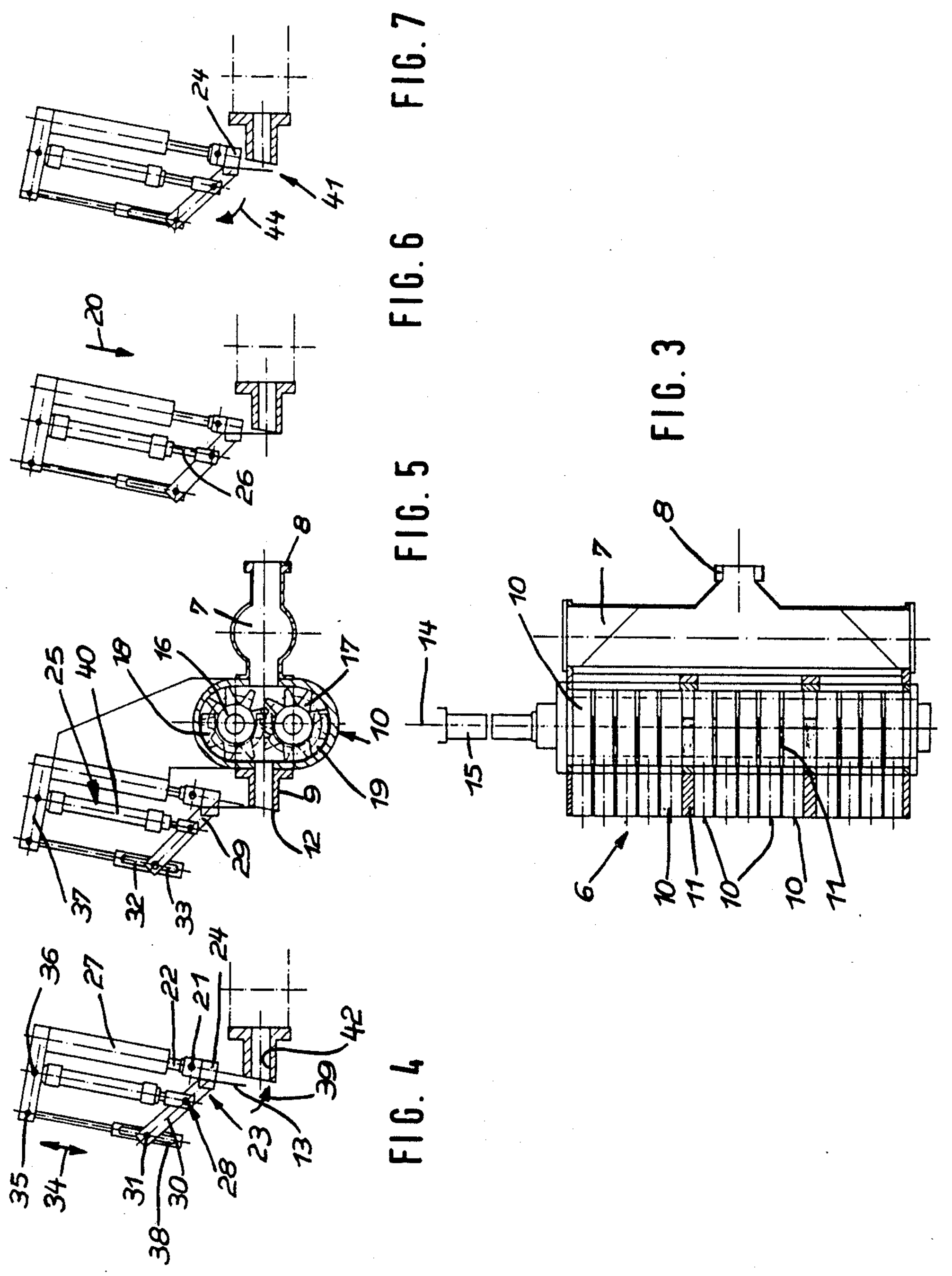
FIG. 3 is a partial plan view of the region of the metering pump set, shown partly in section.
FIGS. 4–7 are schematic representations showing different phases of the operation of the cutter mechanism.

In the initial position of a working cycle of the cutter 13 depicted in FIG. 4, with the power piston 26 in its upper end position, the axis 21 and the axis of the rotary joint 28 lie in a common imaginary plane passing through the geometric axes of the power cylinder and the displacement link, while the abutment member 31 is spaced from this imaginary plane because of the oblique position of the lug 29 with its extension 30 and indeed in the direction to the articulation axis 35 of the control link 33 at a beam 37. The power piston is supported at the beam 37 about an axis 36 to swivel to a limited extent.

The lower end of the oblong hole 32 constitutes a stop 38 for the abutment member 31. It will be seen that the abutment member 31 is at its largest distance from the stop 38 in the original position of the cutter 13, thus, in the retracted end position of the power piston 26. The cutter 13 proceeds from the upper end position shown in FIG. 4 and swivels in the direction of the arrow 39 around the axis 21 against the nozzle outlet 12. This occurs automatically with the action of the swivel drive 23 or of the advance motion of the power piston. As soon as the power piston is moved out of its cylinder 40 in the direction of arrow 20, a torque in the direction of arrow 39 acts at the cutter carrier 24 and also at the cutter 13. Thus, the cutter cutting edge 41 contacts the surface surrounding the nozzle outlet 12 whereby the position shown in FIG. 5 will be reached. The cutter plane which, according to FIG. 4, extends parallel to the surface surrounding the nozzle outlet, is now at an angle with respect thereto.

If the power piston 26 of the swivel drive 23 which simultaneously acts as the cutter drive is extended further, this leads to a shearing off of the exiting string and the formation of a portion 43, or in the case of plural nozzles, to a corresponding number of portions 43. At the point where the cutter 13 has severed the string and has nearly reached its lower end position, the abutment member 31 will rest at the stop 38. During the remaining downward stroke, the extension 30 is swivelled clockwise around the abutment member 31. This leads to a liftoff of the cutter 13 from the surface surrounding the nozzle outlet 12. If now the power piston 26 is lifted counter to the direction of the arrow 20 by reversal of the pneumatic double-acting power cylinder 25, whereby the piston 26 is again drawn into the cylinder 40, then this generates a torque around the axis 21 in the direction of the arrow 44 (FIG. 7) lifting the cutter and the cutter carrier 24 even further off the lower end of the nozzle outlet 12. In the case of further upward movement of the piston 26, finally the original position of the cycle depicted in FIG. 4 is again attained. Particularly, this early liftoff of the cutter already at the end of the cutting stroke enables the advantageous severance with continuously operating charging pump.

Thus, it will be seen that the device of the invention includes articulation means composed of the extension 30, the link 33, the power cylinder 25, the beam 37 and the support 27 which direct the cutter means 13, 24 through a repetitive cutting stroke or cycle during which the cutter means advances parallel to the outlet surface means surrounding the nozzle outlet 12, with the cutter means being immediately thereafter moved away from the outlet surface means and back to the beginning of the cutting stroke.

As a result of this movement of the cutter means away from the outlet surface means surrounding the nozzle outlet 12, a clean and effecting cutting operation is enhanced.

The cutoff portion 43 is deposited upon a conveyance member 45 movable beneath and past the nozzle outlets 12. The conveyance member 45 is provided preferably with a web 47 which can be reeled off a roll 46, in particular, a paper web. The partial portion of the conveyance member 45 which carries or can carry the portions 43 lies on the upper trunk of an endless conveyor belt 48. The level 49 of the conveyor belt, in particular, of its upper trunk 50, is adjustable within predetermined limits. Furthermore, as can be discerned from FIG. 1, the device 2 as well as the device 51 with the gear metering pump set 6 and the cutting device are mobile. A brake or immobilizing arrangement 52 serves for the observance of the correct alignment relative to the conveyor belt 48. The conveyance of the commodity to be subdivided into the portions and the advance motion of the cutter 13 are controlled in such a way by means of a control 53 that the charging pump 3 can function continuously and the respectively correct amount is supplied to the gear wheel metering pump set 6, wherein the severing process occurs in such a manner that the rear and front ends of the portions produced herein and also the portions themselves are not distorted or made to lose their shape. Possibly, the control 53 serves also for other purposes, for instance, the correct functional mode of a comminution arrangement of the device 2. The size of the portion can be adjusted by the control 53. It depends on the conveyance flow, for instance, in the connecting line 5 and the time intervals between the two working movements of the cutter 13.

Thus, it will be seen that, in accordance with the present invention, there is provided a machine able to subdivide a particularly rigid mass not contained in a sausage skin which exits from at least one nozzle 9 into preferably equal portions by attachment of an advanceable and retractable cutter 13 in the region of the nozzle outlet 12. The cutter is displaceable by means of a power cylinder 25 which simultaneously is part of a swivel drive or articulation means 23. With this swivel drive, the cutter 13 can be lifted off and drawn away from the nozzle outlet 12 after termination of the cutting process and it can be advanced again to the nozzle outlet prior to the art of the next cutting process. Thus, the cutting process can be performed without impairing the shape of the portions 43, particularly at equal, preferably preselected, regular intervals with continuous output of the commodity out of the metering pump 10, in particular, however, out of the gear wheel metering pump set 6 with an entire row of such metering pumps. The commodity is supplied to the metering pumps 10 by the charging pump 3 and the portions 43 produced in this manner are advantageously deposited upon the conveyance member 45, wherein this is appropriately a paper web.

While a specific embodiment of the invention has been shown and described in detail to illustrate the application of the inventive principles, it will be understood that the invention may be embodied otherwise without departing from such principles.

What is claimed is:

1. Apportioning apparatus particularly for dispensing comestible material in discrete doses comprising a charging pump having outlet nozzle means comprising at least one outlet nozzle connected therewith through which said material is dispensed, said outlet nozzle means defining outlet surface means at which said at least one outlet nozzle terminates, a cutter advanceable and retractable alongside said outlet surface means of said outlet nozzle means in a cutting direction for cutting the material, a displacement link mounted for movement substantially parallel to the cutting direction, said cutter being mounted to swivel on an axis to said displacement link, said axis extending perpendicularly to the cutting direction, and a swivel drive connected to said cutter at a lug on said cutter which is spaced away from said axis, said swivel drive comprising a working cylinder having a working piston for movement approximately parallel to the cutting direction and a rotary joint connected between said working piston and said lug, wherein said cutter can be lifted off into an advanced end position from said nozzle means and can be returned against said nozzle means prior to the start of each cutting process.

2. Apparatus according to claim 1, wherein said cutter is designed as a flat, strip-like member lying in a plane which extends obliquely to a plane of said outlet surface means during the cutting process.

3. Apparatus according to claim 1, wherein said outlet nozzle means define a longitudinal axis and wherein said outlet surface means lie in a plane which extends obliquely to said longitudinal axis.

4. Apparatus according to claim 1, wherein said charging pump comprises a gear wheel metering pump and wherein said outlet nozzle means are located at an outlet of said metering pump.

5. Apparatus according to claim 4, wherein said gear wheel metering pump comprises a plurality of gear wheels fastened on a common drive shaft arranged to constitute a gear wheel metering pump set and comprising several adjacently arranged gear wheel metering pumps wherein said outlet nozzle means comprise a plurality of outlet nozzles arranged adjacently in a row, with said cutter being arranged as a common cutter operating cooperatively with all of said outlet nozzles.

6. Apparatus according to claim 5, wherein intermediate disc pieces are located between individual ones of said gear wheel pumps of said gear wheel metering pump set particularly in an outlet region thereof.

7. Apparatus according to claim 6, wherein said gear wheel metering pumps comprise inlets which are connected with each other by a transverse distributor having an inlet stub connected with a charging pump to define a flow cycle.

8. Apparatus according to claim 1, further comprising a conveyance member for receiving cut portions of said comestible material located to be moved beneath and past said outlet nozzle means.

9. Apparatus according to claim 8, wherein said conveyance member is designed as a paper web which can be reeled from a roll.

10. Apparatus according to claim 9, wherein said paper web is supported on an endless conveyor belt.

11. Apparatus according to claim 1, wherein said cutter is driven electropneumatically.

12. Apparatus according to claim 1, wherein said working cylinder comprises a pneumatic power cylinder, said working piston comprises a power piston of said cylinder for movement approximately parallel to the cutting direction, said power piston being coupled with said lug of said cutter through said rotary joint.

13. Apparatus according to claim 12, wherein said lug is extended by an extension member beyond said rotary joint of said power piston and wherein a control link is provided carrying an abutment member of said lug extension member which is displaceable and rotatable in an oblong hole of said control link, said oblong hole extending parallel to said power cylinder and to a longitudinal axis of said displacement link.

14. Apparatus according to claim 13, wherein said cutter is mounted for swivelling movement about swivelling axes and wherein said lug at said power cylinder and said swivelling axes are located approximately in a common plane extending perpendicularly to the longitudinal axes of said displacement link and said power cylinder, in an initial position of said cutter and wherein said extension member is located a maximum distance from an end of said oblong hole, which end serves as a stop for said abutment member, said abutment member, at the end of cutting movement of said cutter resting at said stop.

15. Apparatus according to claim 14, wherein said power cylinder and said extension member are pivotable about parallel axes which also extend parallel to a swivel axes of said cutter.

16. Apparatus according to claim 15, wherein a geometric axis of said displacement link is located approximately in a plane of said outlet surface means.

17. Apparatus according to claim 16, wherein an imaginary plane extending through the geometric axes of said displacement link, of said power piston and through said extension member, extends approximately perpendicularly to a plane of said outlet surface means.

* * * * *